US007992432B2

(12) United States Patent
Boumans et al.

(10) Patent No.: US 7,992,432 B2
(45) Date of Patent: Aug. 9, 2011

(54) METHOD FOR OPERATING AN INTERNAL COMBUSTION ENGINE FOR A MOTOR VEHICLE, AND CONTROL OR REGULATING DEVICE FOR AN INTERNAL COMBUSTION ENGINE FOR A MOTOR VEHICLE

(75) Inventors: Marcus Boumans, Ludwigsburg (DE); Markus Bossler, Fellbach (DE); Maximilian Reger, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 330 days.

(21) Appl. No.: 12/338,102

(22) Filed: Dec. 18, 2008

(65) Prior Publication Data

US 2009/0164107 A1 Jun. 25, 2009

(30) Foreign Application Priority Data

Dec. 21, 2007 (DE) ......................... 10 2007 062 170

(51) Int. Cl.
*G01M 15/04* (2006.01)

(52) U.S. Cl. .................................................... 73/114.15

(58) Field of Classification Search ............... 73/114.15, 73/114.13, 114.14
See application file for complete search history.

(56) References Cited

U.S. PATENT DOCUMENTS

| | | | | |
|---|---|---|---|---|
| 6,463,892 | B1 * | 10/2002 | Russell | 123/41.15 |
| 6,604,412 | B2 * | 8/2003 | Jankovic et al. | 73/114.15 |
| 7,735,359 | B2 * | 6/2010 | Umezawa et al. | 73/114.15 |
| 7,775,089 | B2 * | 8/2010 | Suzuki et al. | 73/114.15 |
| 2009/0025467 | A1 * | 1/2009 | Suzuki et al. | 73/114.15 |
| 2009/0043475 | A1 * | 2/2009 | Buslepp et al. | 701/101 |
| 2009/0100920 | A1 * | 4/2009 | Sakayanagi | 73/114.15 |

FOREIGN PATENT DOCUMENTS

DE 37 38 719 7/1988

* cited by examiner

*Primary Examiner* — Eric S McCall
(74) *Attorney, Agent, or Firm* — Kenyon & Kenyon LLP

(57) ABSTRACT

A method for operating an internal combustion engine for a motor vehicle, in which a first signal is determined, which characterizes a torque of the internal combustion engine. In order to provide a method for operating an internal combustion engine for a motor vehicle in which a torque of the internal combustion engine is determined even more precisely, in particular in the region of a zero crossing of the torque, a second signal, which characterizes a state variable of the internal combustion engine and/or the motor vehicle that differs from the torque is determined from the first signal, at least one third signal is recorded, which characterizes a measured value of the state variable, the second signal and the third signal are compared to one another, and the first signal is corrected on the basis of the comparison.

6 Claims, 3 Drawing Sheets

METHOD FOR OPERATING AN INTERNAL COMBUSTION ENGINE FOR A MOTOR VEHICLE, AND CONTROL OR REGULATING DEVICE FOR AN INTERNAL COMBUSTION ENGINE FOR A MOTOR VEHICLE

FIELD OF THE INVENTION

The present invention relates to a method for operating an internal combustion engine for a motor vehicle, in which method a first signal is determined which characterizes a torque of the internal combustion engine. The present invention also relates to a control or regulating device for an internal combustion engine for a motor vehicle.

BACKGROUND INFORMATION

A method and a system for preventing annoying abrupt load-change jerks in an internal combustion engine for a motor vehicle are discussed in DE 37 38 719 A1. Such abrupt load-change jerks arise in particular in response to a sudden change in a setpoint torque of the internal combustion engine, which occurs when a driver suddenly activates or releases the accelerator pedal of the motor vehicle, for example. If such an abrupt change of the setpoint torque is converted directly into a corresponding sudden change of an actuating variable of the internal combustion engine, then a load-change jerk will often occur, which the driver perceives as annoying and which is followed by load change oscillations.

According to the present method, a delayed conversion of an abrupt change for the setpoint torque specified by the accelerator into a change in the actuating variable is implemented at the exact moment when a torque characteristic of the internal combustion engine is passing through zero. This achieves a relatively soft transition from an acceleration operation of the internal combustion engine in which the torque of the internal combustion engine is positive (the internal combustion engine is driving the motor vehicle), into trailing throttle operation of the internal combustion engine in which the torque is negative (the internal combustion engine is braking the motor vehicle), as a result of which the load-change jerk is able to be avoided and the subsequent load-change oscillations are reduced or, ideally, avoided completely. In a corresponding manner, the load-change jerk and the load-change oscillations that occur in a transition from acceleration operation to trailing throttle operation of the internal combustion engine are reduced or avoided. Methods that reduce or eliminate the toad-change jerk and/or the load-change oscillations are generally often referred to as method for load-change formation.

Since motor vehicles are usually not equipped with sensors for ascertaining the torque of the internal combustion engine, it is necessary to determine the torque from various state variables, often with the aid of a characteristics map. However, in the region of the zero crossing, especially in the region of the zero crossing of the torque characteristic, a precise determination of the torque is impossible; as a result, there is the risk that a time interval during which the torque of the internal combustion engine is in the region of the torque's zero crossing is ascertained incorrectly, and the implementation of the abrupt change of the setpoint torque into the change in the actuating variable takes place in delayed fashion not in the region of the torque's zero crossing but in a different region of the torque characteristic. This limits the effectiveness of the method.

SUMMARY OF THE INVENTION

It is an object of the present invention to provide a method for operating an internal combustion engine for a motor vehicle, in which a torque of the internal combustion engine is determined more precisely, in particular in the region of a zero crossing of the torque.

This object may be achieved by a method having the features described herein, and by a control or regulating device having the features also described herein.

According to the present invention, it was understood that the first signal is able to be corrected quite easily with the aid of the third signal detected, in particular measured, by at least one sensor, if the second signal is initially determined from the first signal. The second and the third signals characterize the same state variable of the internal combustion engine, the third signal representing the state variable more precisely than the second signal because the third signal was recorded with the aid of the sensor. By comparing the second and the third signals with one another, the first signal is corrected, thereby reducing a difference between the second and the third signals. That means that the first signal is corrected by the second signal in such a way that a difference between the torque characterized by the first signal and an actual torque of the internal combustion engine is as minimal as possible.

In particular a zero crossing of a characteristic of the torque of the internal combustion engine is able to be ascertained in relatively precise manner in the process. That is to say, using the method, it is possible to provide the torque of the internal combustion engine relatively precisely notwithstanding the fact that it is not directly recorded by a sensor but determined indirectly. In so doing, age-related changes of the internal combustion engine, such as the aging of bearings of the internal combustion engine, are compensated for, so that the precision of the method is maintained with increasing operating time of the internal combustion.

The torque may be a clutch torque of the internal combustion engine, i.e., a torque available at a clutch of the internal combustion engine. However, the method according to the present invention may also be used to determine other torque variables of the internal combustion engine, e.g., an internal torque of the internal combustion engine.

In this context it may be that a control or regulation sequence is controlled, especially activated, in particular for the load-change formation, as a function of the corrected first signal. For instance, it may be provided that the control or regulation sequence for load-change formation is activated when a characteristic of the corrected first signal enters a region about its zero point, or when the characteristic of the corrected first signal crosses the zero point. This ensures that the control or regulation sequence for load-change formation is activated at the correct moment, and a load-change jerk and/or load-change oscillations following the load-change jerk are/is effectively reduced and even eliminated in the ideal case.

If a correction value is determined on the basis of the comparison, and the first signal is corrected by linking it to the correction value, this makes it possible to utilize known method for determining the torque, such methods being based on a torque model of the internal combustion engine and/or the entire motor vehicle in the realization of the method according to the present invention; furthermore, it is possible to dispense with the need for special measures to determine the first signal. In addition, the correction value is able to be stored once the second and the third signals have been compared to one another, and the stored correction value may be continuously linked to the first signal. After the second and the third signals have been compared, the correction value is able to be corrected on the basis of this comparison. The comparison must therefore be carried out relatively infrequently, so that the loading of a control or regulation device by the computing operations required for the comparison and correction of the correction value is kept relatively low. As a result, by providing the correction value, the method is able to be realized in a relatively simple manner.

In this context a linear combination may be formed from the first signal and the correction value for linking the first signal to the correction value. Such a linkage is easy to realize yet still allows the torque of the internal combustion engine to be determined with sufficient accuracy. To simplify the method even further, the linear combination may be implemented as additive linkage of the first signal to the correction value.

According to one exemplary embodiment of the present invention, the state variable, which is characterized by the at least one second signal, may correspond to a rotational speed of the internal combustion engine and/or to a linear acceleration of the motor vehicle. In the known methods for operating the internal combustion engine the rotational speed of the internal combustion engine is recorded for other purposes anyway. Precise and reliable speed sensors, which are connected to a crankshaft or a camshaft of the internal combustion engine, are used to this end. As a result, the detection of the rotational speed of the internal combustion engine is able to be realized with little effort. In the same way, it is possible to utilize provided acceleration sensors of the motor vehicle to detect the linear acceleration. Furthermore, both the rotational speed of the internal combustion engine and also the linear acceleration may be recorded in order to correct the first signal.

To limit the computing operations in connection with the implementation of the method, the second and the third signals may be compared to one another for one measuring interval. Calculations for the mutual comparison of the second and the third signals need therefore be carried out only for this relatively short measuring internal instead of the entire operating time of the internal combustion engine. Computing resources of a control or regulation device on which the method is executed are therefore loaded only to a minimal extent.

The measuring internal may be placed in a segment of the temporal sequence of the first signal in which the latter is easily correctable, so that a corrected first signal is generated that characterizes the actual torque of the internal combustion engine as precisely as possible. In this context the second and the third signals may be compared in the region of the zero crossing of the torque. In this case it is possible for the first signal to be corrected in such a way that the zero crossing of the torque of the internal combustion engine is determined accurately. It therefore may be the case that a specific operating state of the internal combustion engine, in particular the zero crossing of the characteristic of the torques falls into the measuring interval. To achieve this, a start of the measuring interval may correspond to a specific value of the torque and/or to a specific value of the derivation of the torque over time. For an estimate as to whether the zero crossing is imminent may be made on the basis of the value of the torque and the value of a rate of change of the torque that corresponds to the derivation of the torque over time. If the torque or the derivation of the torque has a specific value, then the comparison of the second signal with the third signal may be started for the duration of the measuring interval.

During the measuring interval, the first signal and/or the third signal may be stored. Initially, the first and/or the third signal are/is therefore stored in a memory area of the control or regulating device and evaluated only at a later point in time. As a result, the signals need not be processed in real time, but can be processed in a computing process with lower priority by the control or regulating device. This prevents conflicts of the method according to the present invention with other methods executed by the control or regulating device where real-time conditions have to be observed; furthermore, it is possible to use a cost-effective control or regulating device having relatively low computing power.

As an alternative, instead of the first signal, it is also possible to store the second signal determined from the first signal. This has the advantage that the computational work for the signal processing following the signal detection is reduced and a large portion of the method still does not have to be processed in real time.

It may especially be that the second signal is formed as a function of characteristics of a drive train of the internal combustion engine. That is to say, a drive-train model is utilized that describes the physical characteristics of the drive train. This model may be configured in such a way that oscillations of the second signal, in particular in the zero crossing of the torque of the internal combustion engine, are reproduced as precisely as possible in phase and amplitude. This allows a precise correction of the first signal by comparing the oscillations determined with the aid of the model with the measured oscillations.

A control or regulating device for an internal combustion of a motor vehicle is provided as additional achievement of the object, the device having the features of claim 9. The method according to the present invention is realizable in an especially uncomplicated manner by using a programmable control or regulating device of this type. The control or regulating device has the advantages of the method according to the present invention.

Additional features and advantages of the present invention result from the following description, in which exemplary embodiments are explained in greater detail on the basis of the drawing.

DETAILED DESCRIPTION

Figure 1:
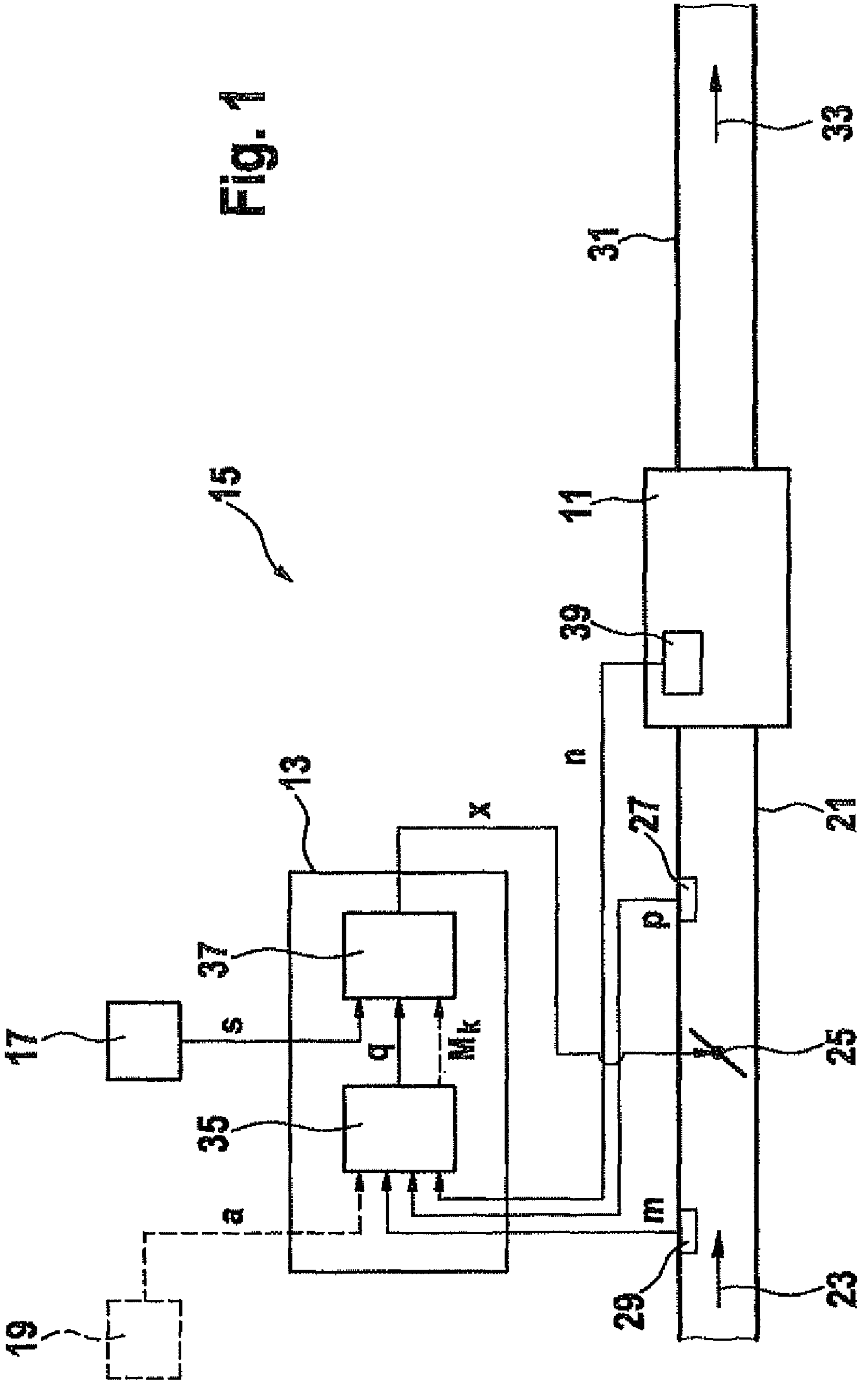
FIG. 1 shows an internal combustion engine and a control and regulating device.

FIG. 1 shows an internal combustion engine 11, which is connected to a control or regulating device 13. Both internal combustion engine 11 and control or regulating device 13 are part of a motor vehicle, which is denoted by reference 15 in the heavily schematic depiction of FIG. 1. Motor vehicle 15 has an accelerator pedal with an accelerator-pedal sensor 17 for generating a sensor signal s, which characterizes a setting of the accelerator pedal. In a further development, motor vehicle 15 as shown by dashed lines in FIG. 1 may have an acceleration sensor 19 for detecting an acceleration signal a, which characterizes a linear acceleration of motor vehicle 15, in particular.

Internal combustion engine 11 is connected to an intake manifold 21 for the aspiration of air (arrow 23 ). Intake manifold 21 is able to be at least partially closed with the aid of a throttle device 25. Between throttle device 25 and internal combustion engine 11, intake manifold 21 has a pressure sensor 27 for generating a pressure signal p, which characterizes a pressure inside intake manifold 21 between throttle device 25 and internal combustion engine 11. Furthermore, an air-mass flow sensor 29 for detecting an air-mass flow signal m, which characterizes a mass flow of air 23 inside intake manifold 21, is disposed on the side of intake manifold 21 facing away from throttle device 25. In addition, internal combustion engine 11 is connected to an exhaust pipe 31 of motor vehicle 15 for the removal of exhaust gases (arrow 33).

Control or regulating device 13 has a first control element 35 for determining a trigger signal q and a corrected signal $M_k$, and also a second control element 37 for a load-change formation in a zero crossing of a torque of combustion engine 11 at a clutch of the internal combustion engine (clutch torque). Connected to first control element 35 are air-mass flow sensor 29, pressure sensor 27, acceleration sensor 19 (if provided), as well as engine-speed sensor 39 of internal combustion engine for detecting an engine speed of internal combustion engine 11. Second control element 37 is connected to accelerator-pedal sensor 17. In addition, throttle device 25 is connected to second control element 37, so that second control element 37 is able to set an opening degree of throttle device 25 with the aid of a control signal x. Finally, a first line for transmitting corrected signal $M_k$ from first control element 35 to second control element 37 is provided between first control element 35 and second control element 37, and a second line is provided for transmitting trigger signal q from first control element 35 to second control element 37.

Figure 2:
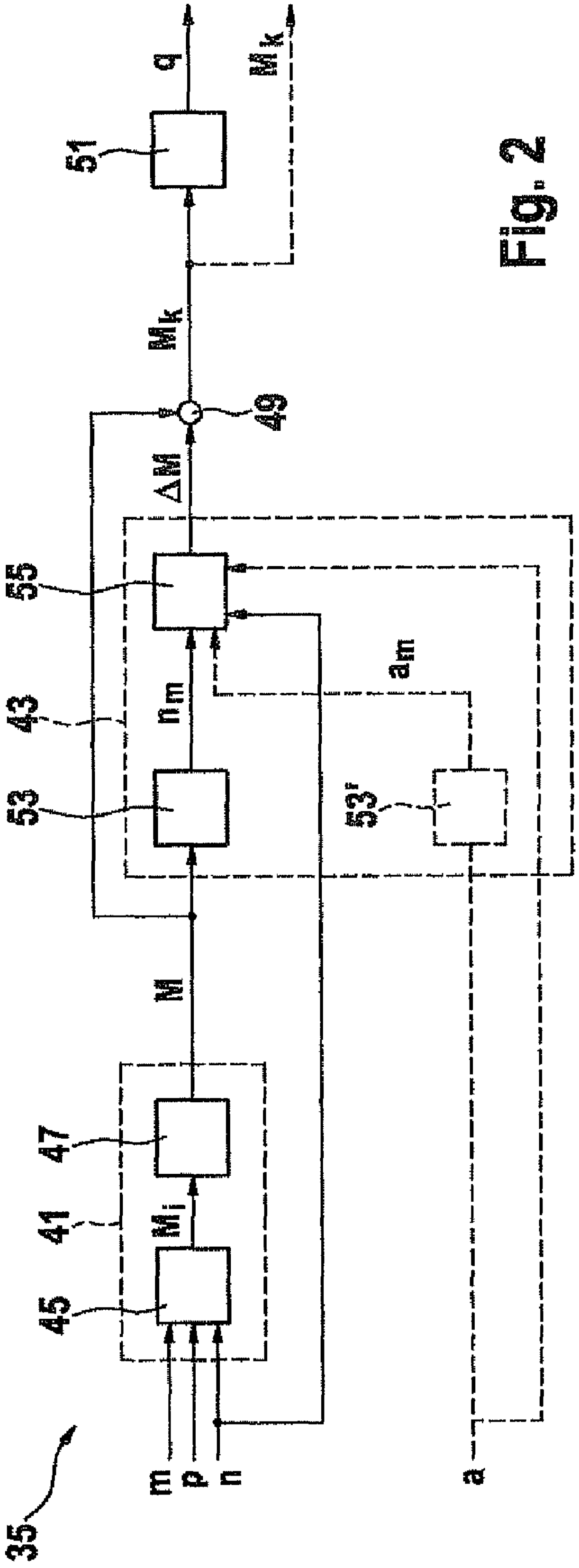
FIG. 2 shows a control element of the control and regulating device.

FIG. 2 shows a detailed view of first control element 35. It can be seen that first control element 35 includes a first computing arrangement 41 for determining a first signal M, which characterizes the torque of internal combustion engine 11 with a relatively low degree of precision. In addition, first control element 35 includes a second computing arrangement 43 for generating a correction value ΔM from first signal M and a third signal n, which characterizes the rotational speed of internal combustion engine 11. A characteristics-map element 45 is connected to air-mass flow signal m, pressure signal p and also third signal n. Characteristics-map element 45 has an output for outputting a signal $M_i$, which characterizes an internal torque of internal combustion engine 11, which output is connected to an input of a first conversion element 47 for converting the internal torque into a clutch torque of internal combustion engine 11.

An output of first conversion element 47 simultaneously constitutes an output of the first computing arrangement 41. The latter is connected to the second computing arrangement 43 and to an input of an adder 49 of first control element 35, Another input of adder 49 is connected to an output of the second computing arrangement 43, so that correction value ΔM is transmitted to adder 49. On the output side, adder 49 is connected to a window comparator 51 of first control element 35. The output of adder 49 may also be connected to second control element 37, as illustrated by dashed lines in FIGS. 1 and 2.

The second computing arrangement 43 includes a second conversion element 53 having an input that is connected to first signal M. An output of second conversion element 53 is connected to an input of a comparator element 55 of the second computing arrangement 43, so that a second signal $n_m$, which characterizes a rotational speed of the combustion engine determined from first signal M, is able to be transmitted to comparator element 55. An output of comparator element 55 simultaneously constitutes an output of the second computing arrangement 43 for the output of correction value ΔM.

During operation of internal combustion engine 11, when throttle device 25 is at least partially open, air 23 is flowing through intake manifold 21 into internal combustion engine 11, and internal combustion engine 11 generates exhaust gases 33, which are routed through exhaust pipe 31. An air-mass flow of air 23 comes about in intake manifold 21, which is detected by air-mass flow sensor 29 and converted into air-mass flow signal m. In the same manner, a pressure inside intake manifold 21 between throttle device 25 and internal combustion engine 11 is detected by pressure sensor 27 and converted into a pressure signal p. A shaft, e.g., a crankshaft of internal combustion engine 11, is in rotary motion (not illustrated), each rotation of the shaft about a specific angle being detected by rotational-speed sensor 39 and converted into third signal n. Furthermore, accelerator-pedal sensor 17 detects a setting of an accelerator pedal and generates a corresponding sensor signal s. If provided, acceleration sensor 19 generates acceleration signal a, which characterizes the linear acceleration of motor vehicle 15.

Air-mass flow signal m, pressure signal p, third signal n and, if provided, acceleration signal a, are forwarded to first control element 35. First control element 35 determines corrected signal $M_k$ and trigger signal q, both of which are transmitted to second control element 37. In the process, first control element 35 triggers trigger signal q whenever the corrected torque of internal combustion engine 11 characterized by corrected signal $M_k$ is in the region of a zero crossing.

Second control element 37 generates control signal x as a function of sensor signal s. In the process, second control element 37 executes a control or regulation sequence for load-change formation. The control or regulation sequence for load-change formation in this method is activated when the corrected torque is in the region of the zero crossing. For instance, second control element 37 is able to convert sensor signal s with a delay into a corresponding control signal x whenever the corrected torque is in the region of the zero crossing, i.e., when trigger signal q is active. To control the air-mass flow of air 23, throttle device 25 adjusts its opening degree as a function of control signal x. The air-mass flow of air 23 affects the torque of internal combustion engine 11. The more the driver of motor vehicle 15 operates the accelerator pedal, the greater the adjusted opening degree of throttle device 25. If trigger signal q is inactive, then second control element 37 immediately converts changes in the accelerator-pedal setting into a corresponding change of control signal x. If trigger signal q is active, then second control element 37 for load-change formation converts abrupt changes in the accelerator-pedal setting into slower changes of control signal x, thereby producing a relatively even transition from trailing-throttle operation to acceleration operation of the internal combustion engine, in which a load-change jerk and load-change oscillations following the load-change jerk are minimal or, ideally, are absent altogether. In a transition from acceleration operation to trailing throttle operation, second control element 37 implements the load-change formation in a corresponding manner.

In the development illustrated, the control or regulation sequence for load-change formation is activated when first control element 35 activates trigger signal q. In a deviation, however, it is also possible to configure second control element 37 to execute another control or regulation sequence for load-change formation. For example, instead of trigger signal q or in addition to trigger signal q, it may be provided that signal $M_k$ controls the control or regulation sequence for load-change formation.

In the following text the manner in which signal $M_k$ characterizing the corrected torque in ascertained is discussed in greater detail. The first computing arrangement 41 determines from air-mass flow signal m, pressure signal p, as well as third signal n, a first signal M, which characterizes the clutch torque of internal combustion engine 11 with a relatively low degree of precision. In the process, characteristics-map element 45 uses these three sensor variables m, p, n to determine signal $M_i$, which characterizes the internal torque of internal combustion engine 11 with a relatively low degree of accuracy. First conversion element 47 converts signal $M_i$ into first signal M, which characterizes the clutch torque of internal combustion engine 11 with relatively low accuracy. Physical characteristics of internal combustion engine 11, in particular losses, a drag torque as well as loading of internal combustion engine 11 by consumers in motor vehicle 15, e.g., an air-conditioning system, are taken into account for this purpose.

The second computing arrangement 43 generates correction value ΔM, which adder 49 adds to first signal M in order to generate corrected signal $M_k$, which characterizes the clutch torque of internal combustion engine 11 with a relatively high degree of precision in comparison with first signal M. Window comparator 51 checks whether the clutch torque, which is characterized by corrected signal $M_k$, is in the region of a zero crossing. If this is the case, window comparator 51 triggers trigger signal q. If the corrected torque is outside of the region of the zero crossing, then window comparator 51 keeps trigger signal q in an inactive state. Trigger signal q is forwarded to second control element 37. In addition, it is also possible to forward corrected signal $M_k$ to second control element 37.

Figure 3:
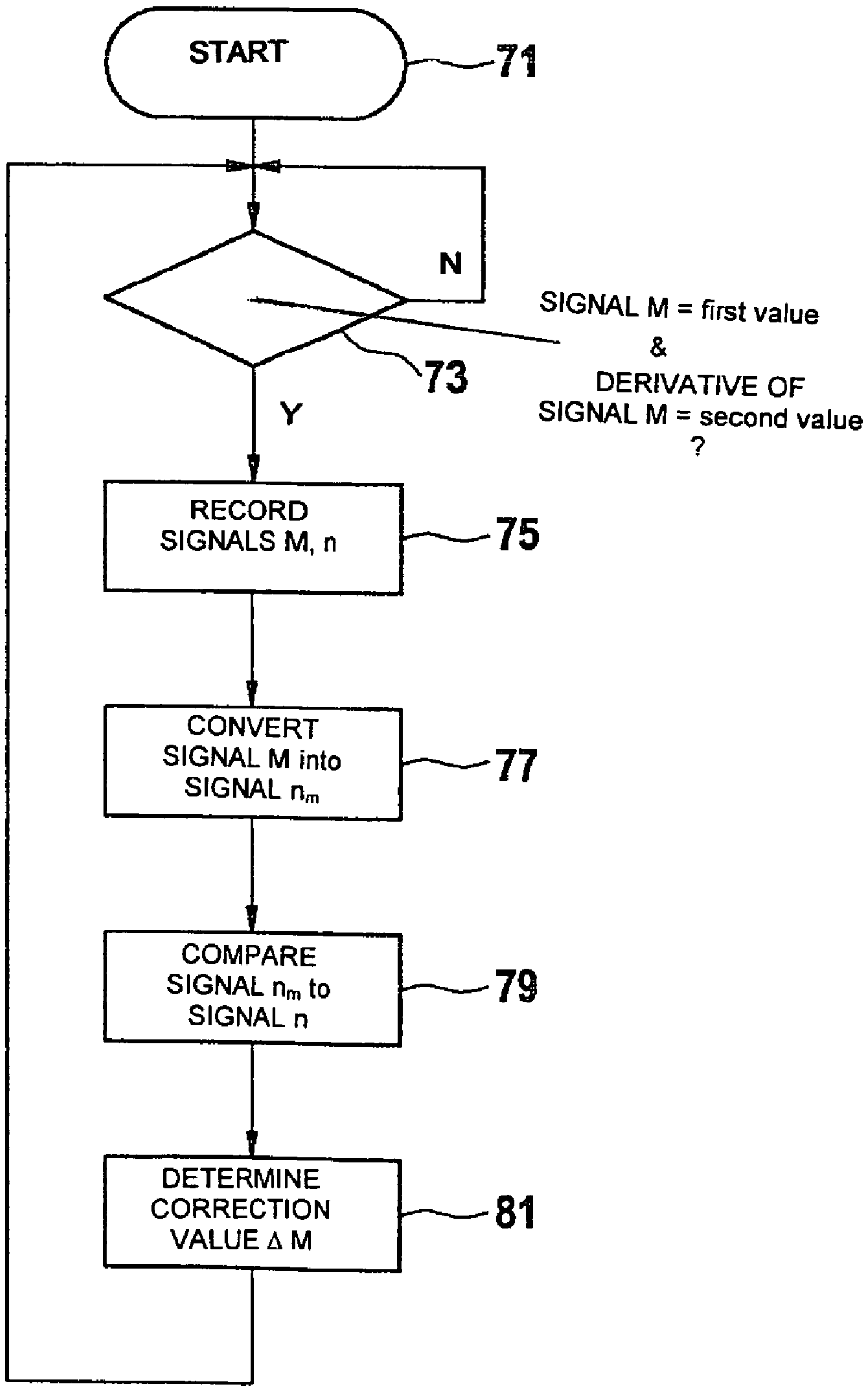
FIG. 3 shows a flow chart of a sequence in a computing system of the control element from FIG. 2.

In the development shown, calculations within the second computing arrangement 43 are not carried out continuously but only at specific instants for a specific measuring interval. The sequence of these calculations is explained in greater detail in the following text with reference to FIGS. 2 and 3.

Following a start 71 of the method, in a step 73 it is checked whether first signal M has attained a specific first value and whether a derivation of first signal M has attained a specific second value. If this is the case, branching to a step 75 takes place, and otherwise step 73 is repeated. Step 73 thus is used to ascertain whether a starting condition for the start of a measuring operation is satisfied. The two values have been selected such that the zero crossing of the clutch torque of internal combustion engine 11 lies within the measuring interval with a high degree of certainty. For correction value ΔM is able to be determined in highly precise manner especially when the zero crossing occurs.

In step 75, first signal M and third signal n are recorded for the duration of the measuring interval and stored in memory areas of control or regulating device 13. Then, in a step 77, stored first signal M is converted into second signal $n_m$ with the aid of second conversion element 53. Second signal $n_m$ characterizes a rotational speed of internal combustion engine 11. Second signal $n_m$ may also be stored in a memory area of the control or regulating device. Second conversion element 53 takes mechanical characteristics of internal combustion engine 11 and the other components of the motor vehicle into account when calculating second signal $n_m$. In other words, corresponding parameters and relationships between these parameters are combined into a drive train model of internal combustion engine 11 or motor vehicle 15, which is stored in second conversion element 53. The drive train model is adapted to a specific model of motor vehicle 15 with the aid of appropriate measuring series in order to obtain a largely precise conversion of first signal M into second signal $n_m$. For example, if first signal M includes an error because of inaccuracies within characteristics-map element 45 or first conversion element 47, then an error will result in second signal $n_m$ as well. Since second signal $n_m$ characterizes the rotational speed of internal combustion engine 11, which is also detected by engine-speed sensor 39, the error of second signal $n_m$ is able to be detected. The error in first signal M may then be inferred from the error of second signal $n_m$, and this error may be corrected, if appropriate. To this end, comparator element 55 compares second signal $n_m$ to stored third signal n in a step 79 that follows step 77. In the comparison of second signal $n_m$ with third signal n, specific characteristics of these signals $n_m$, n, e.g., an amplitude of oscillations $n_m$ contained in the signals or a mutual phase position of the two signals $n_m$, n, are taken into account.

Finally, in a subsequent step 81, correction value ΔM is determined as a function of comparison 77 and output by comparator element 55. Once step 81 has been concluded, a return takes place to step 73, so that correction value ΔM may be determined anew at a suitable moment.

In the further development, the two computing arrangements 43 of first control element 35 additionally include a further second conversion element 53' (shown by dashed lines in FIG. 2), which converts first signal M into an additional second signal $a_m$, which characterizes the linear acceleration of motor vehicle 15 with a relatively low degree of precision. Additional second signal $a_m$ is transmitted to comparator element 55. Furthermore, comparator element 55 is also connected to a further third signal, i.e., acceleration signal a, which characterizes the linear acceleration of motor vehicle 15 with relatively high precision in comparison with additional second signal $a_m$. In addition to the afore-described comparison of second signal $n_m$ with third signal n, comparator element 55 compares additional second signal $a_m$ to acceleration signal a and determines correction value ΔM as a function of this comparison and as a function of the afore-described comparison of second signal $n_m$ with third signal n.

As an alternative, in one development that is not shown, further second conversion element 53' is provided in place of second conversion element 53 of the illustrated embodiment. Comparator element 55 therefore compares only additional second signal $a_m$ with acceleration signal a and determines correction value ΔM as a function of this comparison.

Because of the regular determination of correction value ΔM and the subsequent correction of first signal M on the basis of correction value ΔM, corrected signal $M_k$ is provided, which characterizes the actual clutch torque of internal combustion engine 11 with a relatively high degree of accuracy, which is sufficient to activate the control or regulation sequence for load-change formation implemented by second control element 37 at a suitable instant, i.e., in the region of the zero crossing of the clutch torque.

What is claimed is:

1. A method for operating an internal combustion engine for a motor vehicle, the method comprising:

determining a first signal, which characterizes a torque of the internal combustion engine;

ascertaining a second signal, which characterizes a state variable of at least one of the internal combustion engine and the motor vehicle that differs from the torque, from the first signal;

recording at least one third signal, which characterizes a measured value of the state variable;

comparing the second signal and the third signal to one another; and correcting the first signal based on a result of the comparing;

wherein a correction value is determined based on the comparing, and the first signal is corrected by linking the correction value thereto.

2. A method for operating an internal combustion engine for a motor vehicle, the method comprising:

determining a first signal, which characterizes a torque of the internal combustion engine;

ascertaining a second signal, which characterizes a state variable of at least one of the internal combustion engine and the motor vehicle that differs from the torque, from the first signal;

recording at least one third signal, which characterizes a measured value of the state variable;

comparing the second signal and the third signal to one another; and correcting the first signal based on a result of the comparing;

wherein a linear combination is formed from the first signal and the correction value for linking the first signal with the correction value.

3. A method for operating an internal combustion engine for a motor vehicle, the method comprising:

determining a first signal, which characterizes a torque of the internal combustion engine;

ascertaining a second signal, which characterizes a state variable of at least one of the internal combustion engine and the motor vehicle that differs from the torque, from the first signal;

recording at least one third signal, which characterizes a measured value of the state variable;

comparing the second signal and the third signal to one another; and correcting the first signal based on a result of the comparing;

wherein the state variable, which is characterized by the at least one second signal, corresponds to at least one of a rotational speed of the internal combustion engine and a linear acceleration of the motor vehicle.

4. A method for operating an internal combustion engine for a motor vehicle, the method comprising:

determining a first signal, which characterizes a torque of the internal combustion engine;

ascertaining a second signal, which characterizes a state variable of at least one of the internal combustion engine and the motor vehicle that differs from the torque, from the first signal;

recording at least one third signal, which characterizes a measured value of the state variable;

comparing the second signal and the third signal to one another; and correcting the first signal based on a result of the comparing;

wherein the second signal and the third signal are compared to one another for one measuring interval, and wherein a start of the measuring interval corresponds to at least one of a specific value of the torque and a specific value of a derivation of the torque over time.

5. A control/regulating device for operating an internal combustion engine for a motor vehicle, comprising:

a non-transitory computer readable data storage medium having a program, which is executable by a processor, including:

a program code arrangement having program code for operating the internal combustion engine for the motor vehicle, by performing the following:

determining a first signal, which characterizes a torque of the internal combustion engine;

ascertaining a second signal, which characterizes a state variable of at least one of the internal combustion engine and the motor vehicle that differs from the torque, from the first signal;

recording at least one third signal, which characterizes a measured value of the state variable;

comparing the second signal and the third signal to one another; and correcting the first signal based on a result of the comparing;

wherein a correction value is determined based on the comparing, and the first signal is corrected by linking the correction value thereto.

6. A non-transitory computer readable data storage medium having a program, which is executable by a processor, comprising:

a program code arrangement having program code for operating the internal combustion engine for the motor vehicle, by performing the following:

determining a first signal, which characterizes a torque of the internal combustion engine;

ascertaining a second signal, which characterizes a state variable of at least one of the internal combustion engine and the motor vehicle that differs from the torque, from the first signal;

recording at least one third signal, which characterizes a measured value of the state variable;

comparing the second signal and the third signal to one another; and correcting the first signal based on a result of the comparing;

wherein the state variable, which is characterized by the at least one second signal, corresponds to at least one of a rotational speed of the internal combustion engine and a linear acceleration of the motor vehicle.

* * * * *